United States Patent [19]

Gee et al.

[11] 4,242,142
[45] Dec. 30, 1980

[54] METHOD FOR TREATING GRANULATED BLAST FURNACE SLAG

[75] Inventors: Kenneth H. Gee; John W. Kreiger, both of Bethlehem, Pa.

[73] Assignee: Bethlehem Steel Corporation, Del.

[21] Appl. No.: 52,896

[22] Filed: Jun. 27, 1979

Related U.S. Application Data

[63] Continuation-in-part of Ser. No. 931,803, Aug. 7, 1977, abandoned.

[51] Int. Cl.³ .................................................. C04B 7/02
[52] U.S. Cl. ..................................... 106/97; 106/103; 106/117
[58] Field of Search ................ 106/103, 97, 117; 69/19; 75/24

[56] References Cited

U.S. PATENT DOCUMENTS

| | | | |
|---|---|---|---|
| 2,210,999 | 8/1940 | Bartholomew | 65/19 |
| 2,458,039 | 1/1949 | Wait | 106/51 |
| 3,000,050 | 9/1961 | Reck | 65/19 |
| 3,523,275 | 8/1970 | Rueckl | 106/103 |
| 3,615,329 | 10/1971 | Jones | 65/19 |
| 3,645,708 | 2/1972 | Grady | 65/19 |
| 3,912,487 | 10/1975 | Sharanov | 75/24 |
| 4,127,399 | 11/1978 | Oikawa | 75/24 |

FOREIGN PATENT DOCUMENTS

| | | | |
|---|---|---|---|
| 137979 | 7/1950 | Australia | 75/24 |

*Primary Examiner*—James Poer
*Attorney, Agent, or Firm*—Joseph J. O'Keefe; Charles A. Wilkinson; John S. Simitz

[57] ABSTRACT

A method for treating a water slurry of granulated blast furnace slag containing particles of granulated slag having a size consist of about 0.635 centimeter × 0 (¼ inch by 0) wherein a size separation of the particles is made at about 100 sieve. The sink fraction i.e. coarse particles larger than 100 mesh are partially dewatered and thermally dried prior to being comminuted with raw materials to make portland blast furnace slag cement. The float fraction i.e. fine particles smaller than 100 mesh can be used as is or partially dried prior to being used as an additive or extender for a cementitious material in the production of concrete products.

19 Claims, 1 Drawing Figure

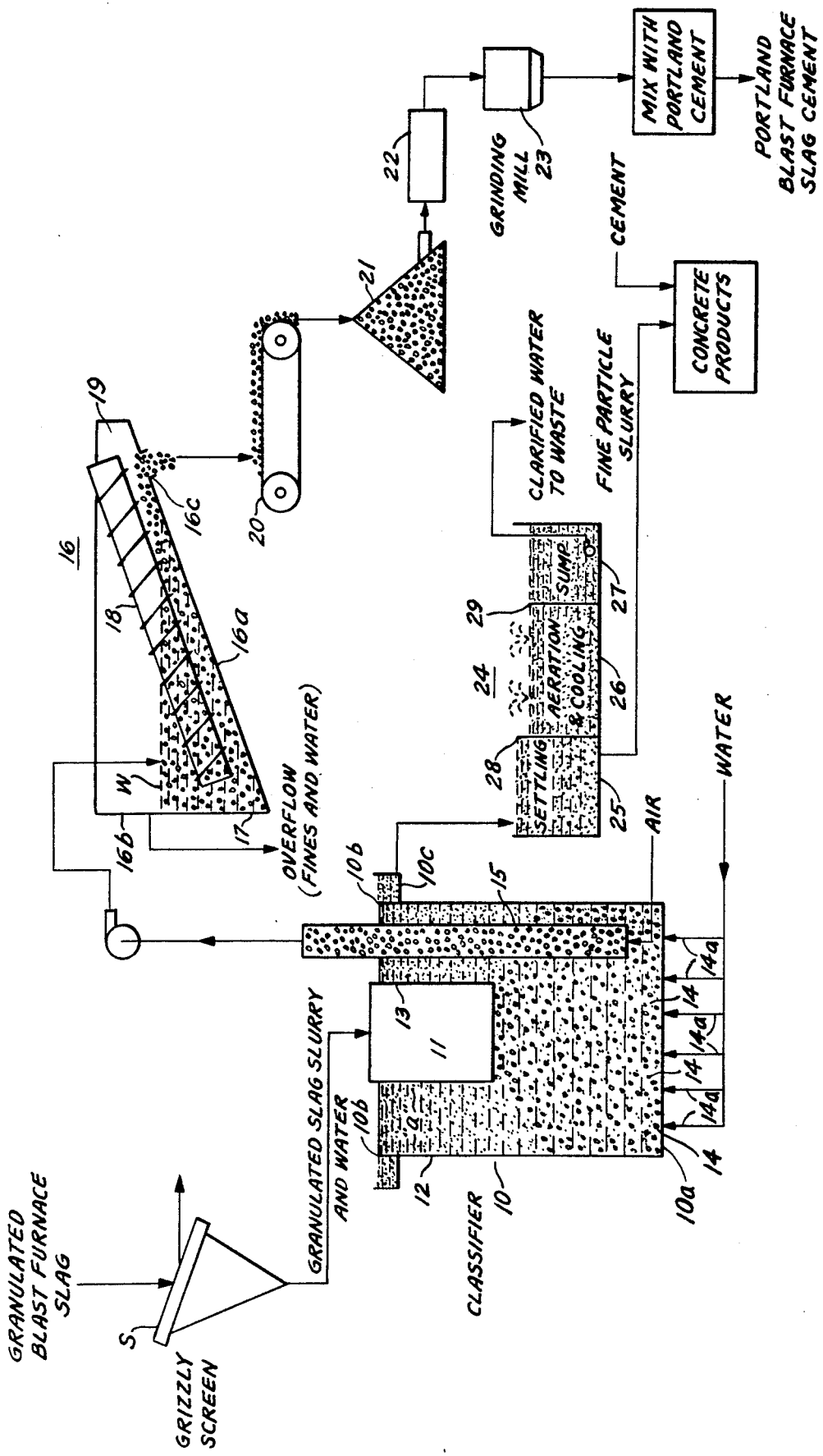

METHOD FOR TREATING GRANULATED BLAST FURNACE SLAG

CROSS-REFERENCES OF THE INVENTION

This is a continuation-in-part of application Ser. No. 931,803 filed in the names of Kenneth H. Gee and John W. Kreiger on Aug. 7, 1978 entitled "Method for Treating Granulated Blast Furnace Slag", now abandoned.

BACKGROUND OF THE INVENTION

This invention is directed to a method for treating granulated blast furnace slag for use in producing portland blast furnace slag cement and as a cementitious extender in the manufacture of concrete products.

Molten slag formed during the winning of iron from iron ores in a blast furnace is tapped from the blast furnace into slag pots and is transported to slag dumps for disposal. Because of the pollution and environmental problems associated with the disposal of the slag, several alternative uses of the blast furnace slag have been proposed. Slag with the proper composition has been fortified with certain chemicals and used as a fertilizer. Other slag because of its composition is processed with cementitious materials to produce a portland type cement, generally referred to as portland blast furnace slag cement. In the production of portland blast furnace slag cement, molten blast furnace slag is sprayed with streams of water to break up the molten slag into small glassy sand-like particles having a size consist of about 0.635 centimeter×0 mesh size (¼ inch×0 mesh). The water/slag mixture thus formed contains about 85 to 95 weight percent water and 5 to 15 weight percent solids. The solids are separated from water prior to mixing with other materials used to manufacture portland blast furnace slag cement. Several processes in which the water is removed from the granulated slag particles are in use. In these processes, the slurry of the particles of granulated slag in water is passed to large vessels or settling tanks. The particles of slag settle to and are accumulated on the bottom of the vessels and the water passes out of the bottom of the vessels. A slurry containing the slag particles and a portion of water which remains in the vessels is accumulated in the vessels. The slurry contains as much as 17 weight percent water. The particles are stockpiled for a time to allow a portion of the water to drain naturally. It is virtually impossible to drain all the water during storage, therefore it is necessary to thermally remove the remaining moisture prior to adding the particles to the other materials required to produce cement. In the process it is necessary to use a plurality of large vessels to collect the particles of slag and partially dewater the slag. The necessity to store the slag particles for a period so that they may be partially dewatered and the subsequent thermal drying increase the cost of the portland blast furnace slag cement produced from the slag. Additionally, environmental control apparatus is required to prevent fine dust particles from passing into the atmosphere during thermal drying.

During storage the moist slag particles may harden because of chemical reactions between the materials in the slag. In the process of hardening, the cementitious materials, such as calcium sulfates, react with the glassy silicate portions of the slag in the presence of moisture and the resultant chemical, calcium silicate hydrate and/or calcium sulfoaluminate, forms a cementitious bond between the particles of slag. As a result, stored granules of slag frequently harden into a solid mass which cannot be easily handled. It is sometimes required to use dynamite to break up a hardened slag pile. A percentage of the stockpiled slag loses its cementitious properties and is then unsuitable for use in producing portland blast furnace slag cement.

There is, therefore, a need for a relatively simple, inexpensive method for treating granulated blast furnace slag for use in the production of portland blast furnace slag cement and as an extender to cementitious materials to produce concrete products, which method alleviates the aforementioned problems.

It is the object of this invention to provide a relatively simple, inexpensive method for treating granulated blast furnace slag for use as an addition to and extender for cementitious materials in which the slag is separated into two portions, one portion containing relatively coarse particles being suitable for use in the production of portland blast furnace slag cement and the other portion containing relatively fine particles being suitable for direct addition to cementitious materials which are used in the manufacture of concrete products.

SUMMARY OF THE INVENTION

The present invention provides a relatively simple and inexpensive method for treating granulated blast furnace slag for use in the production of relatively inexpensive portland blast furnace slag cement and for use as an extender for cementitious material in the direct production of concrete products.

In accordance with the method of the invention, a water slurry containing glassy sand-like granulated particles of blast furnace slag, having a size consist of 0.635 centimeter×0, is initially screened to separate and remove large foreign matter. The particles of granulated slag are then subjected to a size separation comparable to a separation made on a sieve of a desired size, for example 65 sieve size or 200 sieve size and preferably about 100 sieve size. The float fraction of particles, i.e. fine particles which would pass through a sieve of the desired size, may be used as is or may be partially dewatered prior to being used as an extender for cementitious materials in the direct production of concrete products. The sink fraction of particles, i.e. coarse particles which would be retained on the sieve of the desired size, are initially partially dewatered in a classifier or other dewatering device and are stored for a time to allow a second portion of water to drain naturally from the particles. The dewatered particles are thermally dried to remove substantially all the remaining moisture and are then mixed with other materials required for portland blast furnace slag cement. The mixture is comminuted to the fineness required for portland blast furnace slag cement.

DESCRIPTION OF THE DRAWING

The apparatus and the method for treating granulated blast furnace slag as hereinafter described is shown schematically in the drawing.

PREFERRED EMBODIMENT OF THE INVENTION

In the method of the invention, a water slurry of granulated blast furnace slag, which may be produced by any conventional process in which molten blast furnace slag is sprayed by a coolant to disintegrate the slag and form small glassy sand-like particles, is initially screened on a suitable screen or grizzly to remove all foreign matter inadvertently mixed with the molten slag and the slurry during processing. The granulated slag particles generally have a size consist of 0.635 centimeter×0, therefore any screen which will allow all the particle smaller than 0.635 centimeter to pass through the screen as an underflow can be used to remove the large foreign matter.

The relatively clean slurry is passed to a classifier wherein a size separation of the slag particles is made at a desired size, for example a separation comparable to a separation made on a #65 sieve or a #200 sieve and preferably comparable to a separation made on a #100 sieve. The sink fraction, i.e. coarse particles which would be retained on the sieve as the overflow, is preferably passed to a dewatering device wherein a portion of the water is removed. The partially dewatered particles are then passed to storage and are stockpiled for a time to allow a second portion of water to drain naturally from the particles.

The remaining water is then substantially completely removed by thermal drying. The dried particles may be mixed in the proper ratio with raw materials used to produce portland blast furnace slag cement and comminuted to the required size or may be comminuted to a desired size prior to being added to raw materials required to make portland blast furnace slag cement. The float fraction, i.e. fine particles which would pass through the sieve as the underflow, are passed to a settling tank. The fine particles can be used after being partially dewatered or "as is" as an extender to cementitious materials in the direct production of concrete products. In the event there is no immediate requirement or use for the fine particles, a portion of such particles may be dried and stored for future use as an extender in producing concrete products. Drying the fine particles by thermal means is expensive and will therefore be adopted only on an isolated or temporary basis. Likewise, since the fine particles contain most of the activator accumulations of such particles should not be stored too long unless completely dewatered or hardening and loss of cementitious properties may occur.

Turning now to the drawing of the invention and the preferred arrangement of apparatus used in the method, a water slurry of granulated blast furnace slag, which generally contains between about 5 to 15 percent solids by weight, is screened on screen or grizzly S. The slurry is charged into a classifier 10 through a generally cylindrical feed well 11 having a wall 13. The rate of feed of the slurry to the classifier 10 is regulated so that substantially all the relatively large or coarse particles will sink and remain on the bottom 10a of the classifier 10 as a sink fraction and the relatively fine or light particles will be elutriated and carried upwardly by water currents or eddies along the walls 12 of the classifier 10 and will pass over the edge 10b of classifier 10 as a float fraction in the water overflow into trough 10c and pass to a settling section 25 in a settling means 24. A plurality of water jets 14 positioned in the bottom 10a of the classifier 10 feed water 14a upwardly at a controlled rate to promote a generally upward circulation of water in the classifier to aid in elutriating the fine particles. Settling means 24 can be comprised of a series of settling ponds 25, 26, 27 for collecting the fine particles and for aerating and cooling and collecting the water. The settling means may alternatively be a thickener or the like wherein the fine particles are collected on the bottom and clear water overflows the top of the settling section. The particles are allowed to settle in the tank and can be removed in any suitable manner. The particles may be used as removed from the tank or may be partially dried prior to using them as an extender or additive to cementitious material in the production of concrete products, such as building blocks.

The coarse particles or sink fraction in the bottom 10a of the classifier 10 are intermittently removed by any one of several well known devices, for example an air lift pump 15, clam-shell bucket (not shown), and the like. The coarse particles are charged into a dewatering device or second classifier 16, which preferably is a screw or spiral dewatering classifier. The dewatering device 16 comprises an inclined elongated trough 16a having an entry end 17 and a discharge end 19, and a rotatable screw or spiral conveyor 18 mounted therein. The entry end 17 of the classifier 16 is lower than the discharge end 19. A pool of water W is maintained in the entry end 17 of the classifier 16. The depth of the pool W is regulated by an overflow outlet 16b in the entry end 17 to keep the discharge end 19 always above the level of the pool W. As the coarse particles are transported by the screw conveyor 18 from the entry end 17 to the discharge end 19, they are mixed and turned over, thereby dislodging any residual fine particles which adhere to the surfaces of the coarse particles. These fine particles are removed from the dewatering device 16 in the water overflow from the dewatering device at the entry end 17 thereof. The fine particles are separated, for example by vacuum filtration, from the water and are mixed with the particles removed from the settling tank 25. The coarse particles in the dewatering device 16 are transported above the level of the water W by the screw conveyor and are thereby partially dewatered as they pass to the discharge end 19. At least about 80 weight percent of the water is removed from the coarse particles in the dewatering classifier 16.

The partially dewatered coarse particles pass from the dewatering device 16 through an opening 16c onto a conveyor 20 which transports them to a suitable storage space 21. The particles remain in storage for a time, for example about two days, to allow a portion (about 50 weight percent) of the remaining water to drain naturally from the particles. About 85 to 95 weight percent of the water in the original slurry is removed from the particles by dewatering in the device 16 and during storage. The particles are thermally dried in a thermal dryer 22 of any suitable form to remove substantially all of the remaining moisture.

Because the coarse particles are substantially free of fine particles there is minimal danger of air pollution due to the escape of any particles during the thermal drying step. The removal of about 85 to 95 percent of the water from the coarse particles by mechanical treatment and natural drainage reduces the cost of thermal drying. The dried coarse particles are comminuted in a grinding mill 23 to a fineness of between about −325, +600 mesh, which size is suitable for use as portland blast furnace slag cement.

As noted previously, the float fraction or fine particles which are elutriated in the water are carried in the overflow from the first classifier 10 to the settling section 25 of the settling pond 24. The settling pond 24 has a cooling and aeration section 26, and a sump section 27. Clarified water which overflows from settling section 25 over a first weir 28 into the cooling and aeration section 26 is too warm to be recycled in the plant or passed to waste in surface waters. The water is cooled by aeration to a temperature which will allow its use or disposal. The cooled water overflows a second weir 29 into the sump section 27. The fine particles are collected in settling section 25 as a sludge which contains about 40 to 50 weight percent solids. The sludge is removed from the settling section and may be added directly to a cementitious material as an extender in the production of concrete products such as building blocks or the sludge can be partially dewatered prior to adding it to any cementitious material. If there should be no immediate use for the fine particles and a portion of such particles must be temporarily stored, it is advisable to substantially completely dewater them to prevent "setting" thereby causing the loss of cementitious properties. Since thermal drying of the particles is expensive such drying will be adopted only for a portion, at most, of the particles.

The fine particles in the granulated slag constitute about 2 to 10 weight percent solids of the total slag. These particles are the most difficult to dewater and dry because they hold water in more intimate association than the coarse particles. Thus, by preliminarily treating the granulated slag to separate the fine particles from the coarse particles, dewatering of the coarse particles is facilitated and the amount of moisture which must be removed from these coarse particles by thermal drying is reduced.

As noted above, the fine particles or float fraction of the granulated slag may be used as is or only partially dried prior to being used as an extender to manufacture concrete products. There is thus a considerable saving in cost of fuel and energy required for thermal drying. Because the particles are moist it is less likely that such fine particles will escape into the atmosphere during handling, transport and use thereby reducing the hazard of environmental pollution. It is preferred that the finer particles be used as an extender without any drying.

As described above, a size separation of the particles of granulated slag may be made at a size comparable to that obtained by screening the particles on a 65 sieve or a 200 sieve, but it is preferred to make a size separation comparable to that obtained by screening on a 100 sieve.

Generally, granulated blast furnace slag contains a material which is an activator for the hydration of the slag, i.e., the material which induces a cementitious reaction. It is the presence of this activator which is responsible for the cementing together of the coarse particles of granulated blast furnace slag during storage. Cementing of the particles of the granulated slag reduces the cementitious qualities of the slag. It is desirable to remove substantially all the activator from the coarse particles. This is virtually impossible but the amount of activator present in the coarse particles can be substantially reduced by making a size separation comparable to that obtained on a 100 sieve.

If a size separation is made at 65 sieve a relatively large amount of coarse particles report in the fine fraction necessitating drying and comminuting of these particles prior to their use as an extender thereby increasing the cost of treating the particles.

If a size separation is made at 200 sieve, the quantity of coarse particles is increased and the quantity of fine particles in the coarse fraction is increased. Since the activator is generally found in the fine particles, increasing the quantity of fine particles in the coarse fraction increases the amount of activator in the coarse fraction. As a result, the coarse particle fraction is made susceptible to hardening during storage. It also requires more time and thermal drying to remove the moisture from the coarse particles because of the increased quantity of included fine particles which more readily retain moisture than the coarse particles, hence the cost of processing the coarse particles is increased.

As previously noted, although some of the benefits of the invention can be realized by making a size separation at between 65 sieve and 200 sieve, it is preferred to make a size separation at about 100 sieve whereby the maximum benefits of the invention are realized. The closer to 100 sieve size the separation is made, the more satisfactory the results will usually be. Thus it is highly desirable if the separation takes place within a range of about 80 to 120 mesh sieve size. Naturally when a classifier other than an actual screen is used to make a separation between the fine and coarse particles the separation will not be exact, but will be only approximate. In such cases a certain percentage of nominally small particles will be found in the coarse fraction and a certain percentage of coarse particles will be found in the fine fraction, the percentage overlap being a function of the relative efficiency of the classification apparatus or method.

By the use of the described apparatus as shown in the drawing, it is possible to charge a slurry of granulated blast furnace slag containing 5 to 15 weight percent solids which are particles having a size range of about $\frac{1}{4}$ inch $\times 0$ to a first classifier 10 having a diameter of 27 feet, through a feed well 11 having a diameter of 9 feet which is concentric with the wall 12 of the classifier 10. The wall 12 of the classifier may be 20 feet in height and the height of the wall 13 of the feed well 11 may be 5 feet. The area "a" of the free space between the wall 13 of the feed well 11 and the wall 12 of the classifier may be 509 square feet. The ratio of the area (573 sq. ft.) of the classifier 10 and the area (64 sq. ft.) of the feed well 11 is 9 to 1. The ratio of the area between the wall of the classifier and wall of the feed well is 8 to 1. The slurry of granulated slag may be fed at a rate of 10,500 gallons per minute to the classifier. Water at a rate of 3,000 gallons per minute may be introduced into the classifier 10 through a plurality of water jets 14 in the bottom of the classifier 10. The system is regulated to make a size separation at #100 sieve size. A plurality of air lift pumps 15, or alternatively a clam shell bucket is used intermittently to remove the +100 sieve size particles which sink to the bottom of the classifier 10 and charge them into the feed end 17 of the spiral classifier 16. The slurry charged into the spiral classifier 16 contains about 20 weight percent solids, substantially all of which are +100 sieve size particles. The screw conveyor 18 in the dewatering classifier 16 is rotated slowly to transport the particles from the feed end 17 to the discharge end 19. The particles travel upwardly in the spiral classifier 16 to the discharge end 19 and are discharged onto a conveyor 20 which transports them to storage 21. The particles are partially dewatered in the classifier 16 and when discharged into the storage bin 21 contain about 86 weight percent solids. The particles remain in storage for about two days during which time they lose about 5 weight percent water. The stored particles are dried in a rotary dryer 22. The dried particles are comminuted and added to raw materials suitable for producing portland granulated blast furnace slag cement. The mixture is comminuted in a grinding mill 23 to a size whereby substantially all the particles will be −325 sieve size.

The comminuted coarse particles of granulated slag can then be used to make a Portland blast furnace slag type cement, for example, ASTM Type IS blended cement wherein the weight percent of slag in the blended cement may range from 25 to 65 weight percent with the balance being Portland cement.

The −100 sieve size particles which constitute about 5 weight percent of the granulated slag fed to the separating classifier 10 are removed from the classifier 10 with the overflow water and pass to settling section 25 where they are allowed to settle. The −100 sieve size particles collected in the settling section 25 form a sludge containing about 40 to 50 weight percent solids. The clarified water passes over the weir 28 into the cooling and aerating section 26. The water is sprayed into the atmosphere to cool it from about 165° F. (74° C.) to a temperature suitable for discharging into environmental surface water or for reuse in the plant. The cooled water overflows a second weir 29 into the sump section 27 from which it is pumped either into environmental surface waters or to a conduit which recycles the water to the plant. The sludge collected in the settling section 25 is passed out of the bottom of the settling section 25 and is added to a cementitious material as an extender in the production of cement or concrete products such as building blocks. In another convenient use of the finer particles, such particles are mixed while moist with other materials to form ready-mix concrete in a ready-mix concrete plant.

One very significant use for the moist fine slag material is to produce concrete building blocks. Lightweight expanded slag blocks are usually made from an aggregate-cement mix which contains about 10 to 15 weight percent cement, for example a mix containing 7310 pounds of aggregate and 850 pounds of cement will make 255 building blocks each weighing about 32 pounds and being comprised of 28.7 pounds of aggregate and 3.3 pounds of cement.

In accordance with the method of the invention some of the cement in the blocks can be replaced with the moist granulated slag fines. For example about 30 weight percent of the cement may be replaced with the fines removed from the settling tank. On a dry basis the mix used to make 255 building blocks will then be comprised of:
  total aggregate—7310 pounds
  cement—567 pounds
  slag fines—283 pounds.
Each block will contain 28.67 pounds of aggregate, 2.22 pounds of cement and 1.11 pounds of fines. Other relative amounts of various components of course could also be used.

A second significant use for the moist fine slag materials is in the formation of ready-mix concrete. Since this concrete is supplied to the use site in a wet already-mixed state from a plant, the moist slag fines can be added directly to the mix in the ready mix plant.

In the ready mix concrete industry, 3000 pounds compressive strength general purpose concrete is made from a mix having a typical composition shown below in pounds of material used to make a cubic yard of final concrete mix:
  coarse aggregate—1800 pounds per cubic yard
  fine aggregate—1340 pounds per cubic yard
  cement—517 pounds per cubic yard.

The water to cement ratio is 5.5 gallons per sack, i.e., 5.5 gallons per 94 pounds dry weight of mix.

It is possible to replace about 33 percent by weight of the cement with the moist fine granulated slag particles produced by the method of the invention to make a similar cement or Portland granulated slag cement. A typical ready mix cement mix using moist granulated slag fines is shown below on a dry basis:
  coarse aggregate—1800 pounds per cubic yard
  fine aggregate—1340 pounds per cubic yard
  cement—345 pounds per cubic yard
  fine particles—172 pounds per cubic yard.

While the invention has been described above with some particularity, it will be understood that the invention is broader than the particular arrangement of apparatus and encompasses any process in which granulated blast furnace slag is initially separated while still moist into two separate portions, one portion containing coarse slag particles, i.e., particles which would be retained on a #65 to #200 sieve size, but preferably on about a #100 sieve size screen, and the other portion containing the fine slag particles, i.e. those particles which would pass through a #65 to #200 sieve size or preferably through about a #100 sieve size screen. The portion containing the coarse particles is dewatered by mechanical means and allowed to drain and can then be economically dried by thermal means and comminuted or ground to the size necessary for use in portland type blast furnace slag cement. The portion containing the fine slag particles, which constitutes a fairly small part of the granulated slag as a whole, but has been discovered to cause most of the difficulty in drying the slag, is used in the meantime in a moist condition or partially moist as an extender for cement in the fabrication of concrete products such as in a ready-mix concrete plant, cement block plant or other type of operation which can use the fine moist particles without further treatment. All necessity for drying or storing this portion of the slag is thus obviated.

Examples of alternative mechanical size separation and dewatering devices or arrangements which could be used to effect the separation into coarse particle portions and fine particle portions within a roughly #65 to #200 sieve size range, and preferably a more restricted range as set forth above, would be arrangements in which the preferred dewatering device or classifier 16 shown on the accompanying FIGURE is eliminated and the classifier 10 is modified so that the slag particles within it are agitated by various means such as clam buckets or screws or paddle means or other mechanical agitation mechanisms acting during the entry of the slurry into the classifier. The coarse particles are removed from the classifier in some manner such as by such clam buckets or screw conveyor devices. The coarse particles can then be thermally dried. The fine particles will be carried from the classifier in the same manner as shown in the FIGURE in the overflow. The agitation and removal devices used within the classifier may be the same mechanisms, however additional agitation devices can also be used in the classifier. It will be found that a fairly good separation into coarse particles and fine particles can be made by such arrangements and the coarse particles can be effectively dewatered as they are removed from the classifier by the removal means.

It will be understood from the above that the invention is of sufficient scope to include any arrangement where an effective or practical separation is accomplished between the fines and coarse particles such that sufficient fines are separated from the coarse particles to render the thermal drying of the coarse particles significantly more economical than would otherwise be the case and in which the fine particles can then be used in a moist or semi-dry condition in a ready mix plant, cement block plant or other type of operation which can use fine moist particles without further treatment. By operating in accordance with the invention a very efficient, economical and practical method for preparing granulated slag for use in cement and concrete is provided.

Where sieve or mesh sizes are referred to in this application standard U.S. series sieve sizes are intended.

We claim:

1. A method for preparing a water slurry of granulated blast furnace slag containing about 5 to 15 weight percent solids which have a particle size of 0.635 centimeter×0, for use in producing portland blast furnace slag cement and as a cementitious extender in producing concrete products comprising:
   (a) screening the water slurry to separate and remove substantially all foreign matter from the water slurry,
   (b) charging the water slurry into a classifier wherein the particles are separated into a coarse fraction and a fine fraction,
   (c) partially dewatering the coarse fraction in a dewatering device and collecting the fine fraction in a tank,
   (d) discharging the coarse fraction from the dewatering device to storage wherein a second portion of water is allowed to drain naturally from the coarse fraction,
   (e) thermally drying the coarse fraction to remove substantially all the remaining moisture therefrom,
   (f) mixing the coarse fraction with raw materials suitable for producing portland blast furnace slag cement,
   (g) comminuting the mixture of step (f) to specified size, and
   (h) adding the fine fraction as an extender to cementitious materials in the manufacture of concrete products.

2. The method of claim 1 in which the separation made in step (b) is made at a size comparable to that made on a 65 sieve.

3. The method of claim 1 in which the separation made in step (b) is made at a size comparable to that made on a 200 sieve.

4. The method of claim 1 in which the separation made in step (b) is made at a size comparable to that made on a 100 sieve.

5. The method of claim 1 in which about 80 weight percent of the water in the coarse fraction is removed in said dewatering device in step (c).

6. The method of claim 4 in which about 50 weight percent water remaining in the partially dewatered coarse fraction is removed in step (d).

7. The method of claim 1 in which the thermally dried particles are comminuted to a desired size prior to being mixed with raw materials suitable for producing granulated blast furnace slag cement.

8. The method of claim 1 in which the particles in the fine fraction are collected in a settling pond in step (c).

9. The method of claim 8 in which the particles in the fine fraction are partially dewatered to produce a slurry containing about 40 to 50 weight percent solids.

10. The method of claim 1 in which the particles in the fine fraction comprise about 5.0 weight percent of the slurry in step (a).

11. A method for using granulated blast furnace slag in the preparation of cement and concrete products, comprising:
   (a) preparing a slurry of granulated blast furnace slag particles having a size consist of about 0.635 centimeter×0 in water,
   (b) charging the slurry into a classifier wherein a size separation comparable to that made on a screen size within a range of 65 to 200 mesh sieve size is made; the coarse particles comprising a sink fraction and the fine particles comprising a float fraction which contain about 5.0 weight percent of the particles in the granulated blast furnace slag slurry,
   (c) partially dewatering the particles in the sink fraction and collecting the particles in the fine fraction as an overflow from the classifier,
   (d) storing the partially dewatered particles of the sink fraction for a time to allow a second portion of water to drain naturally separate from the particles,
   (e) thermally drying the particles,
   (f) combining the particles with raw materials suitable to make a cement composition,
   (g) comminuting said dried particles, and
   (h) adding the particles in the fine fraction to cementitious materials to produce concrete products.

12. A method of claim 11 in which the separation is made at a size within the range of 80 to 120 mesh size.

13. The method of claim 11 in which the separation is made at a size comparable to that made on a 100 sieve.

14. A method according to claim 11 wherein the particles in the fine fraction derived from the step described in subparagraph (b) is partially dewatered prior to using.

15. A method for preparaing granulated blast furnace slag for use in producing portland blast furnace cement and cement products comprising:
   (a) preparing a slurry of granulated blast furnace slag particles having a size consist of 0.635 centimeter×0 with water,
   (b) screening the slurry to remove foreign matter therefrom,
   (c) charging the slurry into a classifier wherein a size separation comparable to that made on a sieve within a range of 65 to 200 mesh size is made, the coarse size particles reporting as a sink fraction and the fine size particles reporting as a float fraction,
   (d) partially dewatering the coarse sink fraction,
   (e) thermally drying the coarse sink fraction,
   (f) mixing the coarse sink fraction particles with a material suitable to produce portland blast furnace slag cement,
   (g) grinding the coarse sink fraction particles and material to a size useful for cement, and
   (h) mixing the fine sink fraction particles as an extender with cementitious material to manufacture concrete products.

16. A method according to claim 15 in which the separation of (c) is made at a size within the range of 80 to 120 mesh size.

17. A method according to claim 15 in which the separation is made at a size comparable to that made on a #100 sieve.

18. A method of preparing granulated blast furnace slag for use in making cement products according to claim 15 wherein the classification of the granulated blast furnace slag is made at a sieve size which will assure that a major portion of an activator usually contained in the granulated blast furnace slag is contained in the fine sink fraction particles.

19. The method according to claim 15 in which the thermally dried coarse sink fraction is ground to a desired size prior to being mixed with raw materials suitable for producing granulated blast furnace slag cement.

* * * * *